June 10, 1958 M. ROVIS 2,838,041
MARBLE CUTTING AND FINISHING MACHINE
Filed Feb. 17, 1956 3 Sheets-Sheet 1

INVENTOR.
MAX ROVIS
BY

June 10, 1958 M. ROVIS 2,838,041
MARBLE CUTTING AND FINISHING MACHINE
Filed Feb. 17, 1956 3 Sheets-Sheet 2

INVENTOR.
MAX ROVIS
BY

INVENTOR.
MAX ROVIS

United States Patent Office 2,838,041
Patented June 10, 1958

2,838,041

MARBLE CUTTING AND FINISHING MACHINE

Max Rovis, Flushing, N. Y.

Application February 17, 1956, Serial No. 566,293

14 Claims. (Cl. 125—13)

This invention relates to a marble cutting and finishing machine and more particularly to a machine adapted to perform straight and circular cutting operations on marble and stone, as well as to perform other cutting, shaping, molding, polishing and drilling operations.

In the production of stone and marble items, such as table tops, fireplaces, wall and surface coverings and ornamentation, lamp bases and the like, it is naturally necessary to perform certain cutting, shaping, molding, polishing and drilling operations upon the raw slab of marble or stone. Heretofore each of these operations had to be carried on with machinery equipment and tools specifically adapted for the performance of a single operation and has therefore involved a considerable quantity of machinery and equipment as well as frequent transfer of the workpiece from one machine to another with the attendant cost in time and labor involved. Furthermore the frequent transfer of the workpiece involves considerable risk of breakage or fracture thereof. Additionally the equipment for the performance of the above enumerated functions now available and in use operates upon the workpiece in such manner as to be time consuming and produces considerable waste of raw material.

It is therefore an object of this invention to provide a machine capable of performing the above enumerated functions upon a marble or stone workpiece wherein the single machine is capable of performing all of these functions and wherein the workpiece need not be transferred as these operations are progressively performed thereon.

It is further an object of this invention to provide a machine comprising a unitary structure wherein a workpiece is positioned on a single work support assembly and wherein such operations as circular or straight cutting, shaping, molding, polishing or drilling operations may be performed thereon.

Other and further objects, benefits and advantages of this invention will become apparent from the description thereof contained in the annexed drawings, specifications and claims or will otherwise become obvious. It will be understood that the invention herein disclosed may be employed for other purposes for which the parts, structure and arrangement are adapted.

Figure 1:
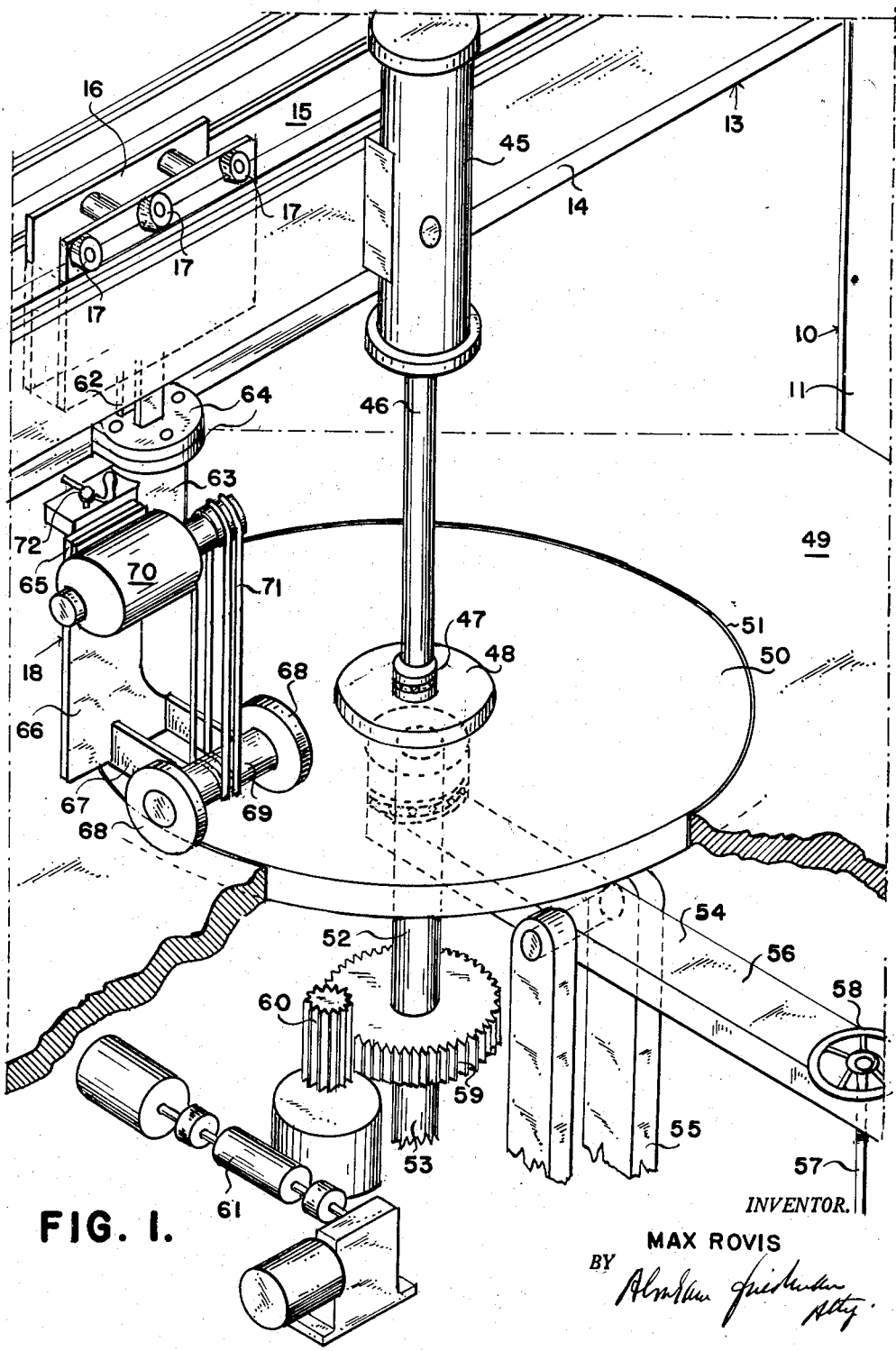
Figure 1 is a fragmentary perspective view on an enlarged scale of the machine showing the cutter and workpiece supporting assemblies.

In its general aspects the present invention comprises a machine for cutting and finishing stone or marble workpieces which includes a supporting structure or assembly upon which a workpiece supporting assembly comprising a stationary platform and turntable are secured. The supporting structure additionally includes a bridge assembly which carries and operatively locates a cutting assembly with respect to the workpiece. The supporting structure also carries means for clamping the workpiece in position and a finishing assembly which is similarly adapted to be operatively positioned with respect to the workpiece in order to perform the desired finishing operations thereon.

The supporting structure designated generally by the numeral 10 comprises vertical columns 11 and 12 which are secured to a suitable base not shown. A horizontal bridge designated generally by the numeral 13 is secured transversely across the heads of columns 11 and 12 and supports the cutter traverse arrangement as well as the workpiece clamp as will more clearly appear hereafter. The axis of the horizontal bridge 13 bisects the width of the workpiece supporting platform. The horizontal bridge structure is comprised of a pair of edgewise disposed beams 14 and 15 in parallel spaced relation. A carriage 16 is positioned intermediate beams 14 and 15 and is provided with rollers 17 which rest upon the upper edge of said beams and thereby permit the carriage to be moved along the length of said bridge. Suspended from carriage 16 is a cutter assembly designated generally by the numeral 18 which will be more particularly described hereafter. The cutter assembly supporting carriage 16 therefore permits the cutter assembly 18 to be traversed across the workpiece supporting platform. The traverse movement of the carriage 16 is controlled by means of a sprocket or roller chain arrangement. One end of chain 19 is secured to bracket 20 whence it passes around sprocket wheels 21, 22 and 23, the other end of said chain being secured to the carriage 16. The second chain 24 is secured to a fixed bracket 25 and then passes around sprocket wheels 26, 27 and 28, the other end thereof being also secured to said carriage 16. Sprocket chains 19 and 24 are mounted on a common supporting bracket 29 which is carried by the piston of a hydraulic cylinder 30. The action of the hydraulic cylinder 30 is controlled by means of a solenoid control valve 31. It will be apparent that the foregoing arrangement comprises a multiplying chain drive for the carriage and determines the speed at which the carriage is traversed across the track forming beams of the horizontal bridge. It may also be found desirable to provide reversing limit switches to be contacted by the carriage at the extreme limits of its movement to provide for successive reversal of the carriage movement as each cut is taken. Sprocket wheel 22 is fixedly secured to shaft 32 for rotation therewith, said shaft being rotatably mounted on bracket 20. The other end of said shaft 32 has fixedly secured thereto a bevel gear 33 which mates with bevel gear 34 on shaft 97. An operating handle 35 is secured to shaft 97 thereby permitting sprocket wheel 22 to be manually rotated and thus move the carriage through the action of the connecting chain 19 secured thereto. In this manner the position of the carriage may be manually adjusted to any desired location along the beams 14 and 15. The edge of beam 14 may also be provided with a scale and a pointer secured to carriage 16 will therefore indicate the exact position of the carriage thereon and with respect to the work supporting platform.

Provision is also made for the vertical movement and location of bridge 13 with respect to the workpiece supporting platform. For this purpose the vertical supporting columns and the bridge assembly are provided with slides 36 formed of complementary pairs of slide elements. Gear racks 37 are fixedly secured to the vertical columns adjacent slides 36 and each of slides 36 is provided with a bracket which rotatably carries a shaft 38. Pinion gears 39 are carried by shafts 38 in mating engagement with the gear racks 37. Each of shafts 38 is also provided with a gear 40 in mating engagement with a worm gear 41 secured to shaft 42 for rotation therewith and rotatably mounted in bracket 43. A manual operating handle 44 is secured to the free end of worm gear shaft 42 and it will be apparent that upon the manual turning operation of said handle the consequent rotation of pinion gears 39 will cause the entire bridge assembly to be raised or lowered with respect to the workpiece supporting platform.

The bridge assembly has secured thereto a workpiece clamping assembly. Said workpiece clamping assembly comprises a hydraulic or air operated cylinder 45 capable of operating a reciprocating piston from which piston rod 46 extends. The lower end of piston rod 46 is provided with a thrust bearing 47, the lower race of which has a workpiece engaging disc 48 secured thereto. The undersurface of said disc may be provided with a felt or other facing material so as to enable it to frictionally engage with the surface of the workpiece without causing any damage thereto. It will be apparent from the foregoing that when a workpiece is mounted upon the work supporting platform the operation of the cylinder 45 will cause disc 48 to bear against the workpiece and thus clamp it against displacement. In providing a thrust bearing between the piston rod and the work clamping disc, a workpiece may be effectively supported upon the rotating platform while said platform and workpiece are in motion.

The workpiece is supported upon a platform assembly comprising a fixed platform 49 having a substantially centrally disposed opening 51 therethrough in which a circular rotatable platform 50 is positioned. Fixed platform 49 may be made of any suitable material such as steel plate for grill work and is fixedly secured to vertical columns 11 and 12 at a suitable elevation above the floor level. The rotary platform or table 50 positioned within the opening 51 provided in the stationary or fixed platform 49 is circumferentially spaced from the wall of said opening so that it may freely rotate therein. Rotary table 50 is fixedly secured to the upper end of shaft 52, the lower portion 53 of which is rotatably mounted in a suitable bearing carried at the base of the machine and not shown. Furthermore, shaft 52 is mounted in said base bearing so that it is free for vertical movement therein. The elevating lever 54 is pivotally mounted on supporting bracket 55 which in turn is secured in a suitable manner at the base of the machine. One end of the elevating lever 54 is provided with an opening therethrough which forms a suitable bearing for the upper end of shaft 52. The upper face of the end of said lever is also provided with a thrust bearing abutting with the lower surface of the rotary platform 50. The free end 56 of lever 54 is provided with a screw threaded perforation in which a screw shaft 57 is received, one end of which screw shaft is provided with a hand wheel 58 secured thereto. The other end of said screw shaft bears against the base of the machine and is not shown. It will be apparent from the foregoing that the operation of the hand wheel and consequent rotation of the screw shaft will cause the opposing end of the lever to be raised or lowered thereby raising or lowering the rotary platform or table as desired. Gear 59, which is secured to the rotary table operating shaft 52, mates with a wide faced pinion 60 which is operatively connected to a variable speed drive and clutch arrangement designated generally by the numeral 61. It will be apparent from the foregoing that as lever 54 raises or lowers the rotary table, gear 59 will slide along and continue to be engaged with pinion 60 so that the position of the rotary table may be raised or lowered before or during operation without interrupting the rotation thereof. The foregoing arrangement permits the rotary table to be positioned above, below or at the level of the stationary platform. Thus, when it is desired to support a workpiece larger than the rotary table which is to be rotated during the operations performed thereon, the rotary table is raised above the surface of the stationary platform. If the workpiece is to be stationary, the rotary table may be lowered below the level of the stationary platform or it may be retained at the same level and the drive thereof rendered inoperative.

The cutting operation upon a workpiece is performed by means of the cutter assembly designated generally by the numeral 18. Said cutter assembly is suspended from carriage 16 by means of straps 62 to which are secured a supporting post 63 through a pair of coupling plates 64. Coupling plates 64 are secured to each other so as to permit the lower plate to be rotated through an angle of 90 degrees with respect to the upper plate. By means of this arrangement the supporting post 63 may be similarly rotated through an angle of 90 degrees. Supporting post 63 has secured thereto a slide arrangement designated by the numeral 65. Said slide arrangement 65 has secured thereto a vertical base plate 66 which carries a cutter supporting bracket 67 upon which diamond cutter blades 68 are rotatably mounted. Rotation of shaft 69 to which the cutter blades are secured is accomplished by means of motor 70 similarly mounted on said base plate 66 and interconnected with the cutter blade shaft by means of belts 71. The operation of slide arrangement 65 by means of hand crank 72 raises or lowers the entire cutter blade assembly so as to bring it into or out of engagement with a workpiece and to regulate the depth of cut.

Each end of shaft 69 has secured thereto a circular diamond cutting blade and these blades may be of differing characteristics so that either blade may be employed as desired in accordance with the requirements of the operation being performed on the particular type of material of which the workpiece is composed. When the cutter assembly is in the position indicated in Figure 2 it is adapted to cut circular discs of stone or marble. When employed for this purpose the workpiece is mounted upon the rotary table and clamped by means of the clamping disc arrangement. The workpiece is then rotated with respect to the cutter assembly by the drive mechanism heretofore described while the cutter blade is rotated by means of its associated motor in an opposing direction. In this manner circular discs may be readily cut from stone or marble. The arrangement therefore accomplishes a unique result in that it makes possible the cutting of circular discs by means of a circular blade directly from the slab and utilizing a circular cutting blade. Heretofore it has been the general practice to form circular marble pieces by progressively cutting away the marginal portions of marble until a substantially circular shape is achieved which is then smoothened by means of grinding or similar tools. When circles are cut in accordance with the instant invention, such waste is completely eliminated in that the outer marginal portion of the marble slab remains intact while the circle is cut and removed therefrom. Thus, rings may be cut from the material surrounding the removed circular piece and what would ordinarily be waste becomes a commercially valuable product. This is true particularly in view of the fact that the cutting and ring-like sections out of marble, particularly thin walled rings has heretofore been extremely difficult and costly to accomplish. It is also significant that the danger of fracturing the marble slab both as to the central circular portion and any peripheral ring which may be cut is almost completely eliminated and high cutting speeds may be achieved without danger of fracture or breakage. It is also significant that the entire area of the workpiece is at all times in supporting contact with the rotary table which further materially reduces the fracture possibility. In this connection it should also be noted that the circumferential peripheral wall of the central disc of marble is at right angles or "square" with the plane of the surface thereof. The inside wall of the ring of marble which is simultaneously formed therewith is angularly inclined with respect to the plane of the surface thereof.

The cutting arrangement is also adapted for straight line cutting of marble or stone slabs or similar materials. This is accomplished by merely rotating the cutting assembly on its supporting coupling 64 through an angle of 90 degrees. When so rotated the carriage 16 from which the cutting assembly 18 is suspended is moved across the supporting platform 49 upon which the workpiece is supported and the action of the circular blades is to cut in straight lines parallel with the supporting bridge. The carriage as heretofore indicated is moved back and forth by means of the chain drive so as to cause the cutting assembly to traverse back and forth across the workpiece and to progressively form the cut therein.

Figures 2, 3:
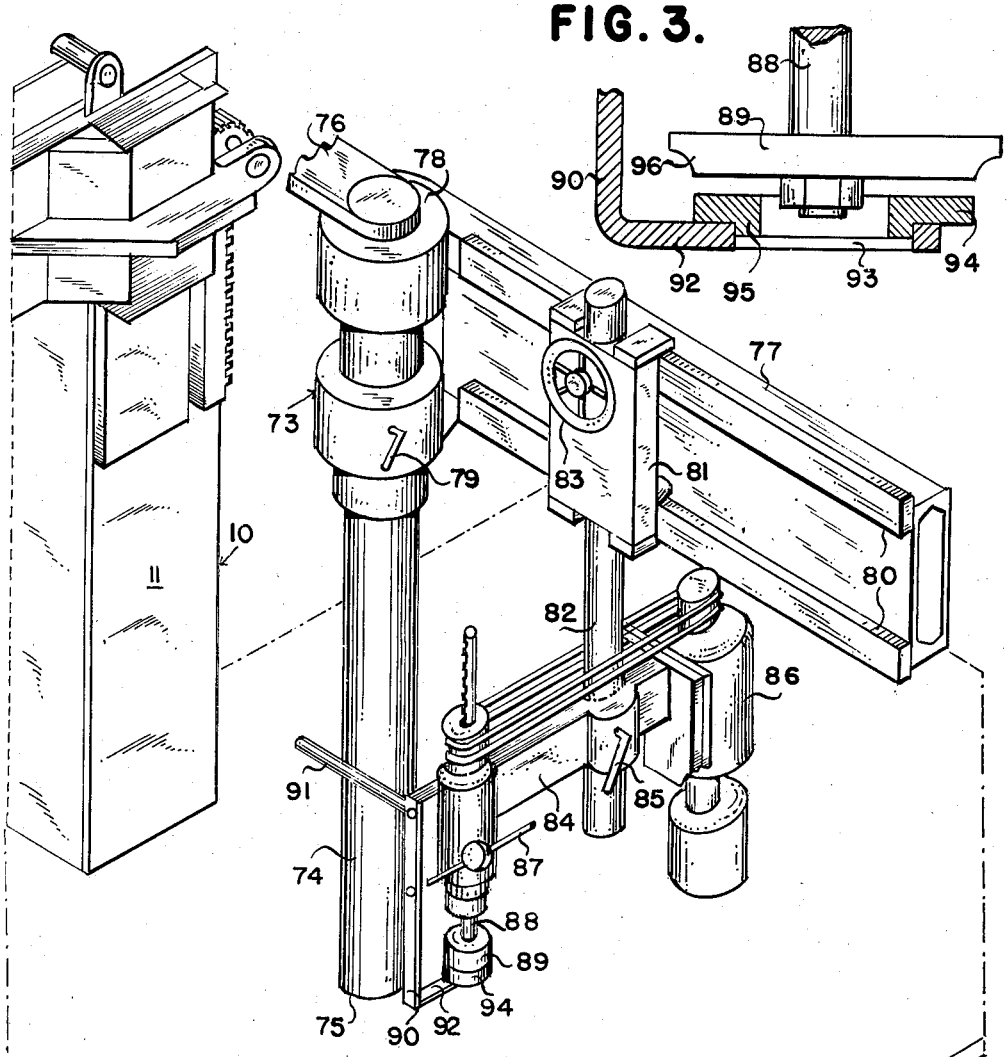
Figure 2 is a fragmentary perspective view of the machine on an enlarged scale showing the finisher assembly.
Figure 3 is a fragmentary cross-sectional view of the cutting head on the finisher assembly on an enlarged scale.
Figure 4:
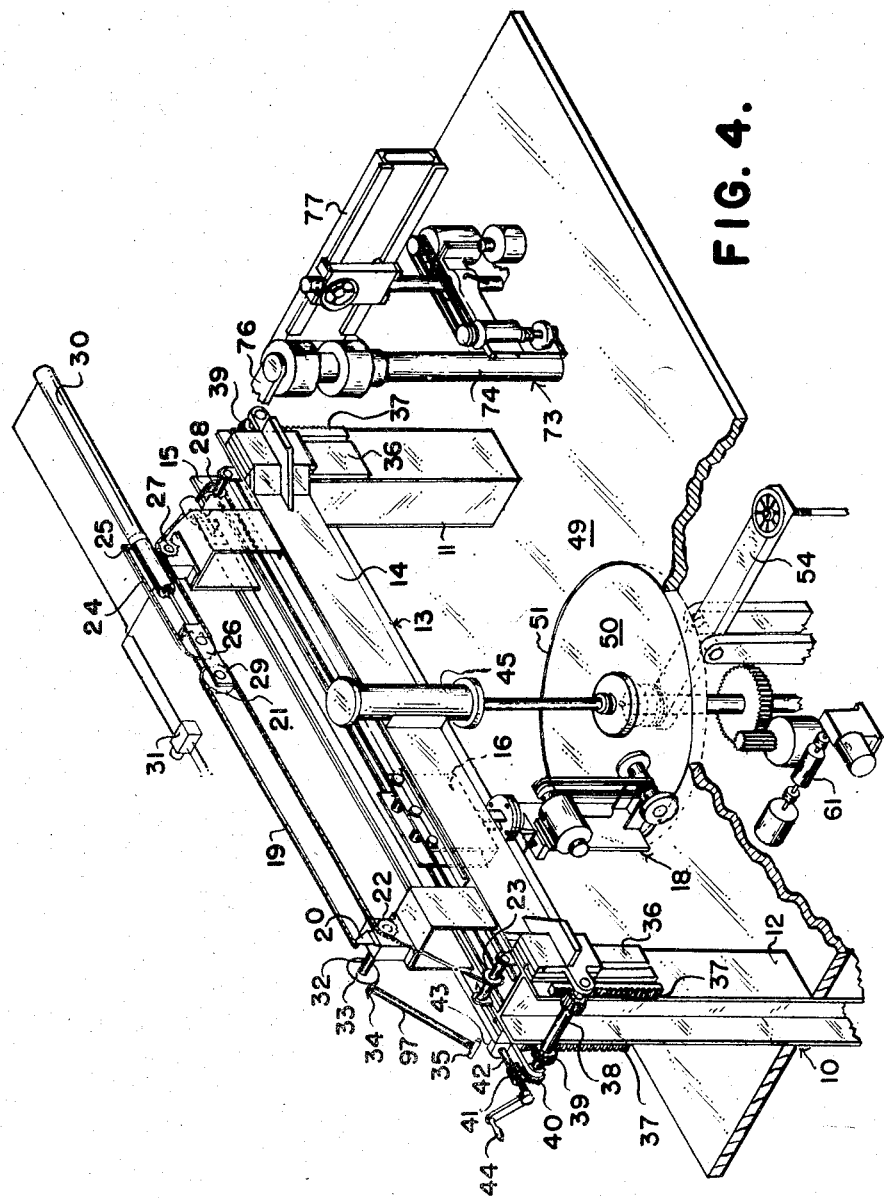
Figure 4 is a perspective view of the machine comprising the present invention partly broken away to show mechanism positioned under the workpiece supporting table.

The shaping, molding, polishing or drilling operations on the stone or marble workpiece are performed by means of the finishing assembly which is designated generally by the numeral 73 and is more particularly illustrated in Figure 2. The finishing assembly comprises a vertical support column 74, the base of which is secured to the stationary platform as shown at 75 and the upper end of which is secured to the supporting structure 10 by means of a bracket 76, which is broken away for purposes of clarity. A horizontally extending track 77 is mounted for pivotal movement on the vertical axis of the column 74 by means of bearing elements 78. Although normally the horizontal track is free for pivotal movement on the vertical column, it may be locked in any desired position by the operation of locking key 79. The horizontal track 77 includes the rails 80 which support a trolly assembly 81. Trolly assembly 81 may thus be readily manually moved along the horizontal axis of the track to any desired position in accordance with the requirement of the particular operation and the location and configuration of the workpiece upon which any given operation is to be performed. Trolly 81 carries a vertically disposed post 82 which may be raised or lowered to any desired height with reference to trolly 81 by the operation of hand wheel 83. Vertically disposed post 82 acts as a support for and carries a horizontally extending supporting arm 84. Supporting arm 84 is mounted for rotation on the vertical axis of post 82 and may be rotated through an angle of 360 degrees and locked in any desired angular position by means of locking key 85. Horizontal arm 84 supports a substantially conventional drill press type arrangement including a motor drive 86 having a suitable reduction gear arrangement. The other end of said arm supports a vertically disposed drill press type operating head including a spindle mounted in a quill and housing therefor. As indicated, this arrangement is quite conventional in that it utilizes the usual form of drill press head in which a spindle is rotated within a quill on a vertical axis and is mounted for endwise reciprocation controlled by the operation of handle 87. The stem 88 of the spindle carries a suitable tool such as a grinding, finishing or polishing wheel 89. Thus, in Figure 3 there is illustrated a finishing wheel which is adapted to form a shaped molding edge on the workpiece complementary in configuration to the shape of the edge 96 of the finishing wheel 89.

It will be apparent from the foregoing that the finishing assembly is capable of being swung into operative position with respect to a workpiece located at any point on the supporting platform including the rotatable portion thereof. To facilitate the movement of the finishing assembly, a bracket 90 is secured to the supporting arm 84 and has a hand grasp 91 extending therefrom whereby the entire assembly may be adjusted and manually moved to any position and brought into operative relationship with respect to a workpiece located on the supporting platform as heretofore indicated. Bracket 90 also comprises a support for a guide, particularly adapted to facilitate the formation of molding or similar edges upon marble pieces. The guide arrangement is more particularly illustrated in Figure 3 wherein it is shown that bracket 90 is provided with a horizontally extending portion 92 having a circular opening 93 formed in the body thereof. A fiber washer 94 having a reduced lower portion 95 of complementary configuration to the circular opening 93 in the bracket is thereby rotatably retained in position on said horizontal portion 92 of the bracket. The fiber washer acts as a limit stop for the downward movement of the finishing wheel 89 so that the depth of cut is determined thereby. Since bracket 90 is fixedly secured to horizontal arm 84, the spindle stem 88 may be raised or lowered with respect thereto by means of operating handle 87. As the tool, which may be a grinding, finishing or similar wheel, is lowered by means of spindle stem 88, the face thereof contacts the upper face of the fiber washer which will then rotate therewith and will also act as a limit stop determining the extreme lowered position of the tool. Thus, by setting the guide bracket 90 at a suitable elevation or by substituting fiber washers of different thicknesses, the downward limit of the depth of cut may be readily fixed so that an even edge is produced on the workpiece. The finishing tool 89 as heretofore indicated may be swung into operative relation with respect to a workpiece located on the stationary or rotary portions of the supporting platform. In this respect it should be noted that the horizontal track 77 is capable of rotation on the vertical axis of supporting column 74, through an angle of substantially 270 degrees and that the horizontal supporting arm 84 may be rotated on supporting post 82 through an angle of 360 degrees and that the operational tool head arrangement may be raised or lowered to any desired position with respect to the supporting platform. Thus, a significant advantage of the instant arrangement is that the finishing tool may be brought into operative relation on a workpiece positioned on the rotary platform which may be raised above the surface of the fixed platform to permit the performance of edge finishing operations thereon. Additionally the workpiece may be rotated by means of said rotary platform while an edging or other finishing or polishing operation is performed thereon so as to facilitate said operation and to increase the speed and efficiency thereof. Another significant feature of this arrangement is that a slab of marble may for example be positioned on the supporting platform, a circular disc cut therefrom and said circular disc may then be finished as by forming a molding edge thereon and the face thereof polished without once removing the workpiece from its support thereby greatly reducing the time and labor involved in the operation, as well as the efficiency thereof in that the danger of breakage of the workpiece is thereby eliminated. Furthermore, it is possible to perform certain polishing or finishing operations on the workpiece while the disc is being cut therefrom since both the finishing assembly and cutting assembly may be simultaneously brought into operative relation with respect to said workpiece.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

1. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening and means for rotating said rotary platform, and additional means for changing the elevation of one of said platforms with respect to the other.

2. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening, means for rotating said rotary platform and additional means for raising or lowering said rotary platform with respect to the plane of said stationary platform.

3. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening, means for rotating said rotary platform, means for raising or lowering said rotary platform with respect to the plane of said stationary platform, cutting means operatively positioned with respect to said stationary and rotating platforms and means for selectively positioning said cutting means with respect to a workpiece on either or both of said platforms.

4. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening, means for rotating said rotary platform, means for raising or lowering said rotary platform with respect to the plane of said stationary platform, cutting means operatively positioned with respect to said stationary and rotating platforms, means for selectively positioning said cutting means with respect to a workpiece on either or both of said platforms and marble finishing means carried by said supporting structure and adapted to be selectively positioned in operative relation with respect to a workpiece positioned on either or both of said platforms.

5. In a machine for finishing marble workpieces including a drill head type tool support provided with a tool supporting spindle adapted for vertical reciprocating movement, said tool comprising a disc-shaped wheel having a lower face disposed in a horizontal plane and being rotatable on a vertical axis, guide means for said tool limiting the extreme downward reciprocation thereof, said guide means comprising a bracket fixedly secured to said drill head support, said bracket being provided with a horizontal portion underlying said finishing tool, a bearing washer carried by said portion adapted to abut with said face of said finishing tool to thereby limit the extent of the downward movement thereof.

6. The machine according to claim 5 wherein said bearing washer is rotatably carried by said horizontal portion of the bracket.

7. The machine according to claim 5 wherein said horizontally extending portion of the bracket is provided with a circular opening therethrough and said washer is provided with a reduced lower portion rotatably received within said opening.

8. The machine according to claim 5 wherein said washer is formed of a compacted fibrous material.

9. A machine for cutting and finishing marble workpieces comprising a supporting structure, said supporting structure including vertically disposed supporting columns and a transverse bridge interconnecting said columns, a stationary workpiece supporting platform carried by said supporting structure and positioned below said transverse bridge, said stationary platform being provided with a substantially centrally disposed opening therethrough, a rotary workpiece supporting platform disposed within said opening, means for raising and lowering said rotary platform with respect to the plane of said stationary platform, means for rotating said rotary platform, a carriage carried by said transverse bridge and adapted to be selectively positioned thereon, cutting means secured to said carriage and suspended therefrom into operative relation with respect to a workpiece on either or both of said platforms.

10. The machine according to claim 9 wherein additional means are provided on said transverse bridge and operatively associated with said carriage for causing said carriage to be reciprocated so as to traverse across a workpiece positioned on either or both of said platforms.

11. The machine according to claim 9 wherein said cutting means includes a rotary cutting disc and motor drive means therefor.

12. The machine according to claim 9 wherein said cutting means includes a rotary cutting blade and motor drive means therefor and means for positioning said cutting blade in tangential relation with respect to a circular line of cut to be executed upon a workpiece positioned on said rotary platform.

13. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening, means for rotating said rotary platform and additional means for changing the elevation of one of said platforms with respect to the other, clamping means carried by said supporting structure disposed to bear upon the surface of a workpiece positioned upon said rotary platform to prevent the displacement thereof while an operation is being performed thereon.

14. A machine for cutting and finishing marble workpieces comprising a supporting structure, a stationary workpiece supporting platform carried by said supporting structure, said stationary platform being provided with a substantially centrally disposed opening therethrough, a rotary workpiece supporting platform disposed within said opening, means for rotating said rotary platform and additional means for changing the elevation of one of said platforms with respect to the other, clamping means carried by said supporting structure disposed to bear upon the surface of a workpiece positioned upon said rotary platform to prevent the displacement thereof while an operation is being performed thereon, said clamping means comprising a reciprocable rod disposed in axial alignment with the axis of rotation of said rotary platform, a thrust bearing disposed upon the end of said rod, said thrust bearing being provided with a workpiece engaging facing to frictionally contact a workpiece disposed upon said rotary platform for rotation therewith, and means for applying clamping pressure to said rod.

References Cited in the file of this patent

UNITED STATES PATENTS

| | | |
|---|---|---|
| 129,905 | Roberts | July 30, 1872 |
| 259,134 | Hall | June 6, 1882 |
| 349,000 | Poiesz | Sept. 14, 1886 |
| 583,875 | Cofran | June 1, 1897 |
| 696,455 | Lahodny | Apr. 1, 1902 |
| 891,199 | Wheeler | June 16, 1908 |
| 1,902,279 | Evans | Mar. 21, 1933 |
| 1,955,081 | McClymont | Apr. 17, 1934 |
| 2,073,678 | Broughton | Mar. 16, 1937 |
| 2,589,357 | Fantozzi et al. | Mar. 18, 1952 |

FOREIGN PATENTS

| | | |
|---|---|---|
| 431,334 | Germany | July 22, 1924 |